(12) United States Patent
Curl (10) Patent No.: US 6,938,734 B2
(45) Date of Patent: Sep. 6, 2005

(54) UNIVERSAL WHEEL LOCKING SYSTEM (76) Inventor: Richard Curl, 623 S. 24th, Arkadelphia, AR (US) 71923

(*) Notice: Subject to any disclaimer, the term of this patent is extended or adjusted under 35 U.S.C. 154(b) by 0 days.

(21) Appl. No.: 10/807,877

(22) Filed: Mar. 25, 2004

(65) Prior Publication Data
US 2004/0188187 A1 Sep. 30, 2004

Related U.S. Application Data (60) Provisional application No. 60/457,188, filed on Mar. 26, 2003.

(51) Int. Cl.$^7$ ................................................ B60T 3/00
(52) U.S. Cl. ................................. 188/32; 70/19; 70/226
(58) Field of Search ........................... 188/32, 36, 4 R;
410/30, 3, 7, 9, 22; D12/217; 70/18, 19,
226–228, 234; 248/346.11, 346.01, 346.1;
414/401

(56) References Cited

U.S. PATENT DOCUMENTS

| 4,649,724 A | * | 3/1987 | Raine .......................... 70/226 |
| 4,819,462 A | | 4/1989 | Apsell |
| 5,137,121 A | | 8/1992 | Leonard |
| 5,427,210 A | * | 6/1995 | Willaford ..................... 188/32 |
| 5,689,981 A | | 11/1997 | DeLuca |
| 6,390,245 B1 | | 5/2002 | Metz |

FOREIGN PATENT DOCUMENTS

| EP | 298716 | * | 1/1989 |
| GB | 2180806 | * | 4/1987 |
| JP | 7-304432 | * | 11/1995 |
| JP | 11-124017 | * | 5/1999 |

* cited by examiner

Primary Examiner—Douglas C. Butler
(74) Attorney, Agent, or Firm—Stephen D. Carver (57) ABSTRACT A configurable wheel lock comprising a rigid chock and an adjustable fork pivoted to the chock that engages a wheel seated within a cradle. The fork projecting from the control portion mounts a pair of separate arms pivoted to opposite ends of an axle that is slidably captivated within guide slots in the chock sides. Projecting arm stubs are inserted within the wheel to be captivated for locking. The fork arms rotate in a first plane that is coplanar with both arms and the axle, and they may be rotated about the axle. These combined rotational features enhance the positional abilities of the arms, and the dexterity of the wheel lock. Rigid locking-links pivoted to at least one of the arms are extended to the opposite arm to lock it in a selected locking position about the wheel.

5 Claims, 13 Drawing Sheets

UNIVERSAL WHEEL LOCKING SYSTEM

CROSS REFERENCE TO RELATED APPLICATION

This application is based upon and claims the benefit of the filing date of U.S. Provisional patent application entitled Universal Wheel Locking System, by inventor Richard Curl, Ser. No. 60/457,188, Filed Mar. 26, 2003.

BACKGROUND OF THE INVENTION

1. Field of the Invention

The present invention relates generally to locks for vehicle wheels. More particularly, the present invention relates to external wheel locks primarily designed for all terrain vehicles (i.e., "ATV's"), which are also adaptable for use with motorcycles, bicycles, cars, trucks, small airplanes, or other vehicles. Known prior art wheel locking systems of the this general type are classified in United States Patent Class U.S. Class 70 Subclasses 225 and 226, and Class 188, Subclass 32.

2. Description of the Related Art

The advantages provided to hunters and outdoorsman by modern all terrain vehicles (i.e., "ATV's") are well known and numerous. These highly maneuverable and dexterous machines greatly increase the hunter's mobility and operating range. They are relatively quiet, safe, and easy to use. However, their relatively light weight is a mixed blessing—thieves find lightweight advantageous!

Even if the ATV is locked through conventional means, a determined thief who discovers the ATV in the woods can push the vehicle towards and up a loading ramp for a quick escape in his truck. With a concerted effort, a thief and one or two accomplices can push the conventionally locked ATV a half mile or so down logging trails where it can be temporarily hidden. After parking the ATV, the unsuspecting owner may have walked a relatively long distance into the woods where his or her tree stand is deployed. At such distances the noise generated by the thieves may not be heard. For these and other reasons it has been recognized that dependable accessory locks are necessary and valuable, and many vehicle-related locks have been developed. However, most known locks have disadvantages.

For example, electronic alarms such as ignition-blocking circuits can often be bypassed by suitable "hot wiring." Even when and if such systems function properly and either warn the owner of the attempted theft or prevent the vehicle from starting, the thief may have seriously damaged the vehicle. Mechanical contrivances such as steering wheel locks can be easily defeated in a matter of seconds simply by cutting through the plastic steering wheel. On the other hand, some externally mounted designs, known as "outboard" wheel locks or "chocks," can be quite effective in immobilizing the vehicle to which they are attached. Typical external locks can be effective for boat trailers, snowmobile trailers, motorcycles, or other small, wheeled devices that are parked and left unattended. Unfortunately, available wheel chock devices are heavy, cumbersome, expensive, and difficult to install. In other words, typical external chocks are unsuitable for use by hunters who must travel lightly through the words, often in the dark over rough terrain.

There is a favorable market for light-weight, strong and reliable chock-type wheel locks that are especially adapted for small vehicles and trailers, especially ATV's. Such a device is ideal not only for protection against theft, but for safely storing certain vehicles or trailers so that they will not injure young children who might be tempted to drive or move them when their parents or guardians are inattentive, absent, or careless.

U.S. Pat. No. 5,689,981 to DeLuca, issued Nov. 25, 1997, discloses an anti-theft vehicle wheel lock for temporarily immobilizing a wheel of a vehicle. The wheel to be immobilized rests upon a ground engaging chock. The wedge-shaped chock mounts an angularly displaceable facing bar that can be rotated relative to the ground. The facing bar, which abuts the wheel, mounts an adjustable, transverse engaging bar whose body touches the tire tread. A projecting J-shaped hook portion of the engaging bar is drawn into the wheel well on the opposite side of the facing bar to penetrate and enter the wheel well. The engaging bar is thus juxta-positioned such that the chock and the wheel are mechanically coupled, preventing wheel rotation and thus vehicle displacement.

U.S. Pat. No. 5,137,121 issued to Leonard on Aug. 11, 1992 discloses a portable trailer wheel chock for temporarily locking vehicle wheels. A generally pyramidal enclosure cradles a portion of the wheel to be locked. A generally "U"-shaped wheel-engaging jaw is rotatably supported by the chock. The jaw has telescopic base segments supporting opposed, inwardly extending stubs that can engage opposite wheel well portions to captivate the wheel. A padlock secures the chock in a captivating position, such that the jaw stub ends sandwich the captivated wheel between them.

U.S. Pat. No. 4,819,462 issued to Apsell on Apr. 11, 1989 discloses an external wheel locking clamp with a chock portion that is not placed against the ground. The clamp must be secured by external lug bolts fitted to the inner wheel hub. The clamp peripherally surrounds the tire with cooperating, first and second interlocking L-shaped members that captivate the wheel.

U.S. Pat. No. 6,390,245 to Metz issued May 21, 2002 discloses a wheel chock against which the wheel rests. An elongated, handle pivoted to the lower chock projects upwardly adjacent a side of the captivated wheel. The handle has an intermediate portion connecting upper and lower substantially orthogonally to each other. The handle is formed from a hollow continuous tube with the lower end thereof adapted to rest on the ground beneath the wheel chock.

BRIEF SUMMARY OF THE INVENTION

This invention comprises a portable locking chock that can be temporarily fitted to an external wheel of a vehicle or trailer to prevent theft. Ideally, the preferred lock is light-weight and highly durable, facilitating ease of use by hunters, outdoorsman or others requiring a dependable and portable lock. The device is easy to transport and store, and very convenient to install and deploy.

The preferred wheel locking system comprises a rigid, flat and generally rectangular chock that lies upon the ground. The chock comprises a plate having recessed cradle portion in which the wheel to be locked is seated, and an adjacent, slightly elevated control section. A fork comprising a pair of separate, radially adjustable arms is pivoted to the control portion. These forks adjustably project away from the plate towards the wheel to be engaged. The arms include projecting stubs that are adapted to be inserted within the wheel to be captivated for locking.

Preferably, each fork arm is pivotally connected at one end of a rotatable axle that transversely penetrates the control end of the chock. The fork axle is preferably oriented perpendicular to the longitudinal axis of the chock, being slidably mounted between a pair of opposed slots in the plate sides. Prior to deployment of the lock, the axle is thus free to slide towards or away from the cradle. The fork arms are free to rotate about two centers of rotation. They rotate in a first plane that is coplanar with both arms and the axle, and they can also be displaced about a center of rotation established by the axle when it rotates within the slots relative to the plate. These combined rotational features enhance the positional abilities of the arms. In other words, a variety of different wheel shapes, sizes, and configurations can be accommodated. In an alternative design, the fork axle may be fixedly pivoted within the chock control end, instead of being slidably mounted.

Preferably, a rigid locking-link is pivoted to one of the arms and is extended to the opposite arm to lock them in a selected, engaging position about the wheel, once the axle is slided towards an appropriate position relative to the wheel and the arms are thereafter closed. The link has a plurality of locking apertures defined in it for registering with an apertured tab in the other arm, once the lock is installed. When padlocked in position, the locking link maintains the arms about opposite sides of the wheel in a rigid and firm engagement therewith. The link will rigidly bridge the arms to semi-permanently lock the apparatus and captivate the wheel.

Alternatively, rigid locking links, one of which is pivoted to each of the arms, can be used for locking. These links project towards one another, and each terminates in apertures that may register once the links are aligned and drawn together. A suitable fitting couples the links together, and a padlock protected within a bracket locks the links together. As the links are drawn together prior to locking, the arms firmly grab the wheel to be locked and secure the locking chock to it to prevent rotation.

Therefore a primary object of my invention is to provide a portable wheel chock device that is ideal for temporarily locking ATV's, trailers, motorcycles, and similar lightweight vehicles.

Another general object of my invention is to provide an improved wheel chock device of the character described that quickly and dependably locks the wheel of a vehicle to temporarily prevent rotation, thereby securing the vehicle against theft and unauthorized use.

A further object is to protect ATV's against theft and unauthorized use.

Another object is to provide a locking chock that is dependable, easy to install, and convenient to transport.

It is also an object of my invention to provide a wheel chock of the character described that is compact and easily stowable.

Another object is to provide a wheel lock of the character described that is not only rugged and durable, but easily transportable as well.

A further object of the present invention is to provide an improved wheel chock device of the character described that can be releasably and temporarily secured to a vehicle wheel without special tools.

A similar object to provide an improved wheel chock device that externally mounts in position upon a wheel to be captivated without removing or adjusting the vehicle's hub lug nuts.

Another basic object is to provide a reliable locking chock of the character described that readily mounts upon a wide variety of wheels of different sizes, aspect ratios, offsets, and depths.

A still further object is to not only keep a vehicle safe from theft, but also to prevent it from rolling down inclines.

An overall general object is to make a lock of the character described that is perfect for cars, trucks, ATV's, boat trailers, camping trailers, riding lawn mowers, tractors, work trailers, motorcycles, small airplanes.

These and other objects and advantages of the present invention, along with features of novelty appurtenant thereto, will appear or become apparent in the course of the following descriptive sections.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
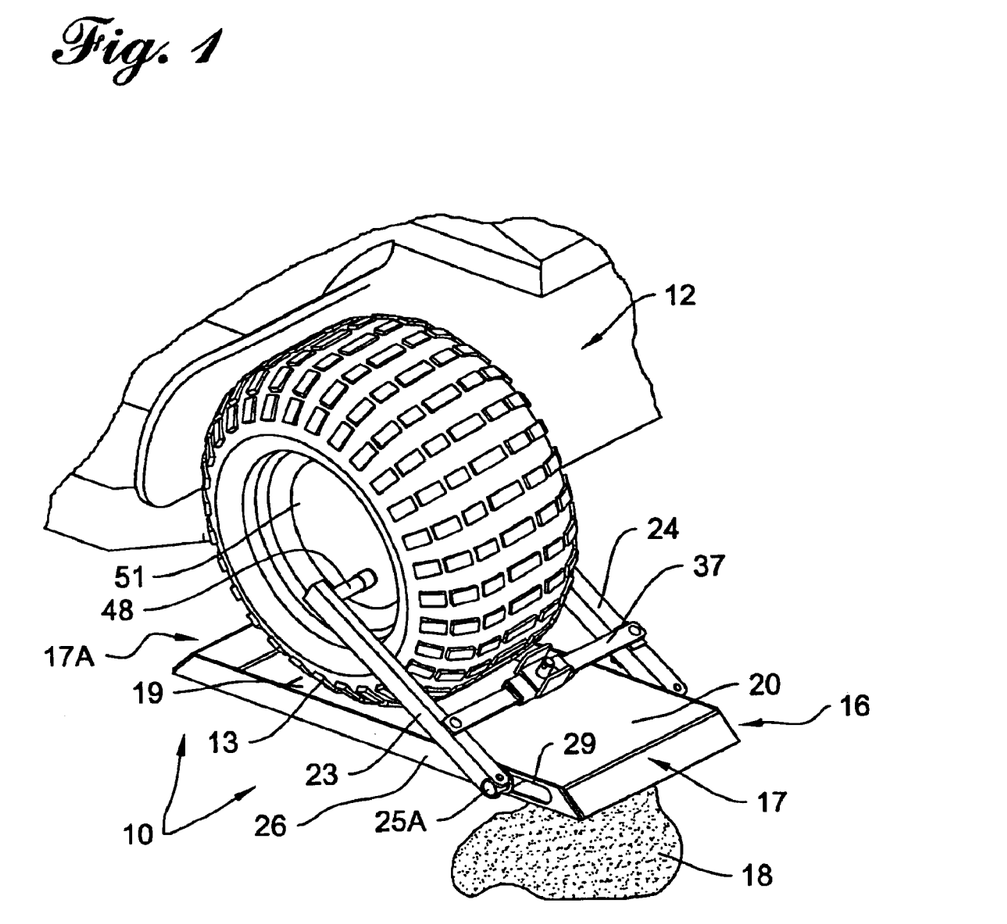
FIG. 1 is a fragmentary, frontal isometric view showing the preferred locking device properly installed upon a typical ATV wheel.
Figure 2:
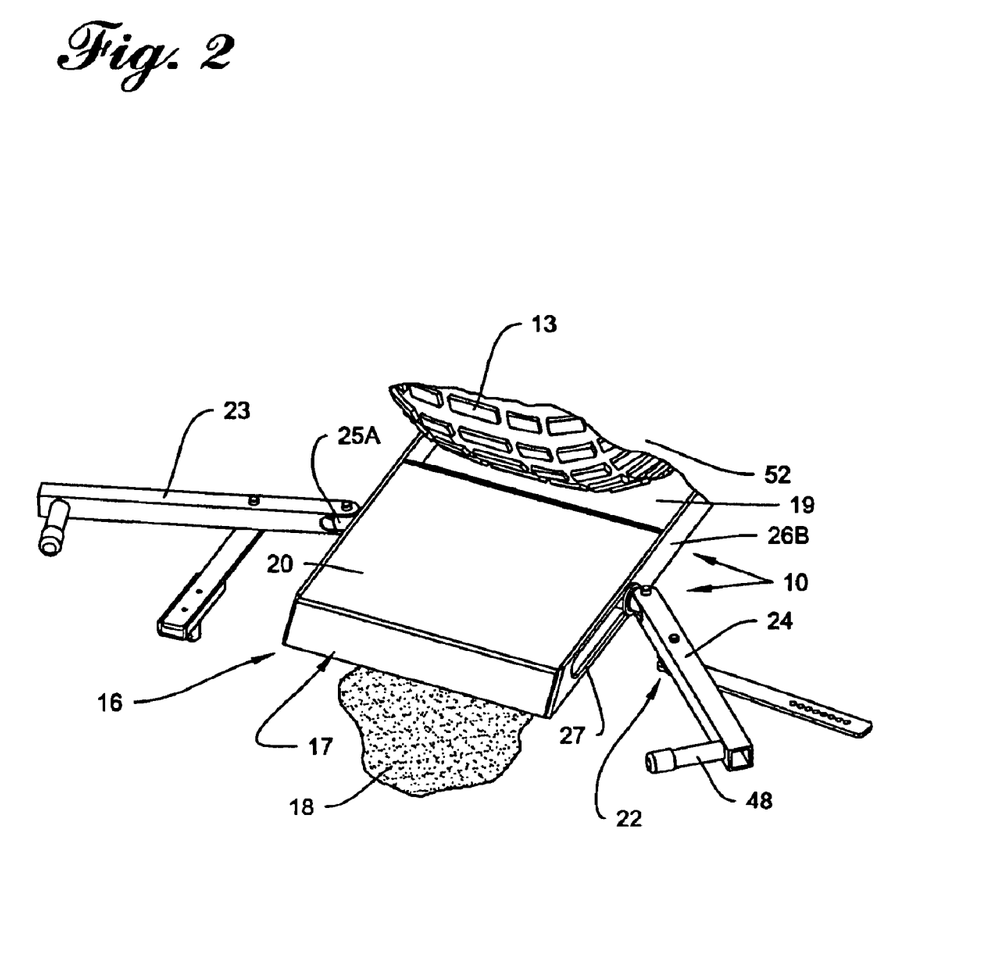
FIG. 2 is a fragmentary, rear isometric view.
Figure 3:
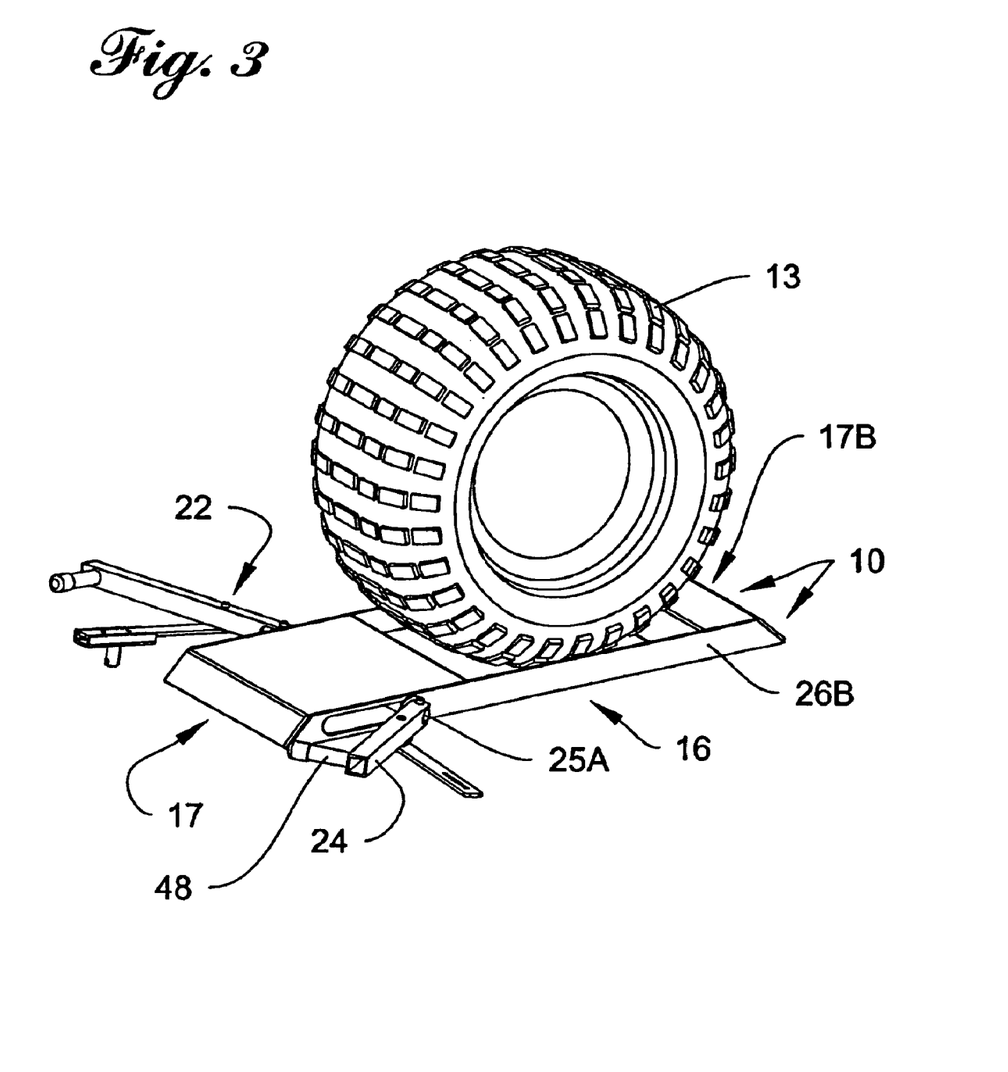
FIG. 3 is an isometric view of the lock of FIGS. 1 and 2.
Figure 4:
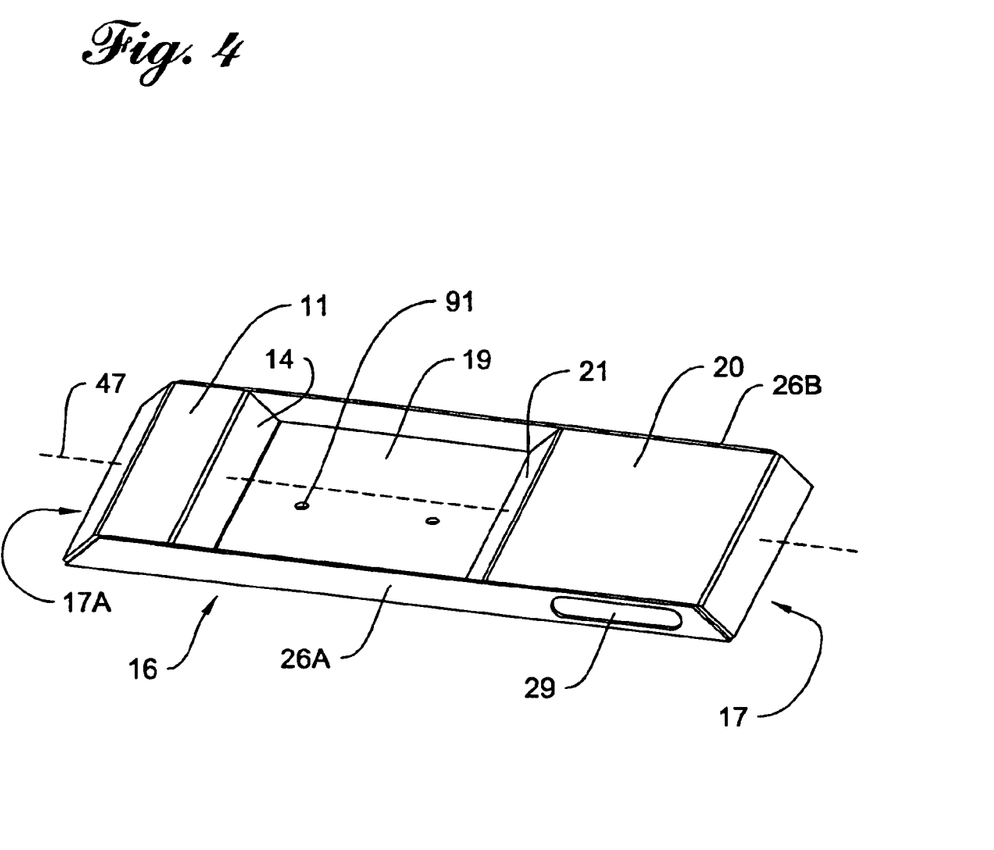
FIG. 4 is an isometric view of the preferred wheel chock.
Figure 5:
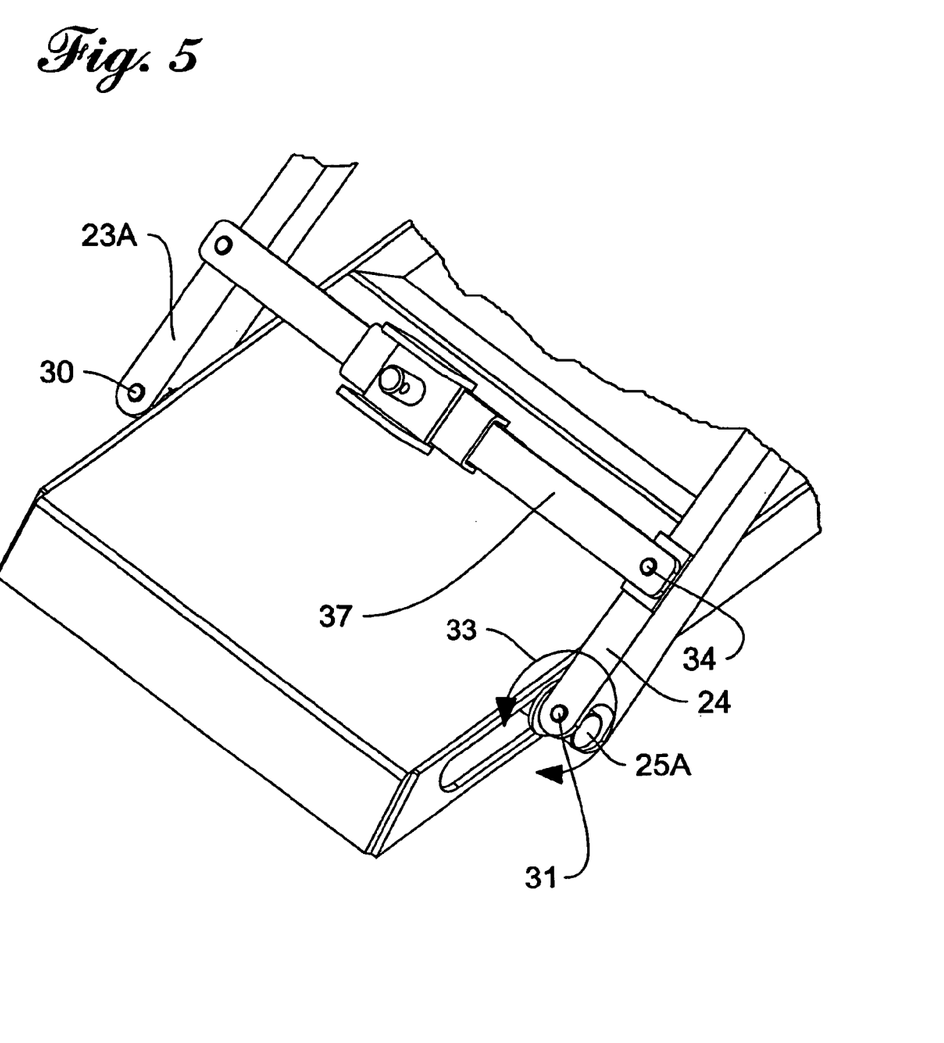
FIG. 5 is an enlarged, fragmentary isometric view.

With initial reference directed now to FIGS. 1–3 the appended drawings, my new wheel lock has been generally designated by the reference numeral 10. While the lock 10 is adapted for use with a wide variety of vehicles, a conventional ATV 12 (FIG. 1) is illustrated. ATV 12 includes an exposed, external rear drive wheel 13 to which my lock 10 is removably installed as described hereinafter for immobilizing the ATV 12. Of course, it will be recognized by those skilled in the art that lock 10 may be deployed upon a variety of wheels to protect various diverse vehicles and wheeled devices such as motorcycles, three-wheelers, light trailers, utility implements, lawn and garden vehicles, and the like.

With additional reference directed to FIGS. 4–13, the preferred lock 10 comprises a rigid, generally flat chock 16 (FIG. 4) adapted to be flatly placed upon a supporting surface such as the ground 18. A first the chock 16 is positioned proximate the wheel 13 of the ATV or other device to be locked and protected. The preferably metallic chock 16 is in the form of a generally rectangular plate, having an internal cradle 20 in which a wheel 13 may sit. Cradle 20 is defined between a raised barrier 11 at its front 17A and a spaced-apart, raised control portion 19 generally defined at its rear 17. The control portion 19 is longitudinally separated from the cradle 20 by a transverse, inclined divider 21, and barrier 11 is similarly bounded by an inclined divider 14 (FIG. 4) that make it easier to place and captivate a wheel within cradle 20. The longitudinal axis 47 of the chock 16 (FIG. 4) extends generally between the front 17A and the rear 17.

Preferably, an adjustable and displaceable fork, generally designated by the reference numeral 22, emanates from and is associated with the chock control portion 19. The purpose of the fork 22 is to grasp a wheel to be locked, confining it within the cradle 20 (FIG. 4) of the chock 16.

The fork comprises a pair of similar, rigid, elongated arms 23, 24 that are pivoted to opposite ends 25A of axle 25 (i.e., FIG. 11) that extends between the chock sides 26A, 26B (FIGS. 1, 2).

Figure 11:
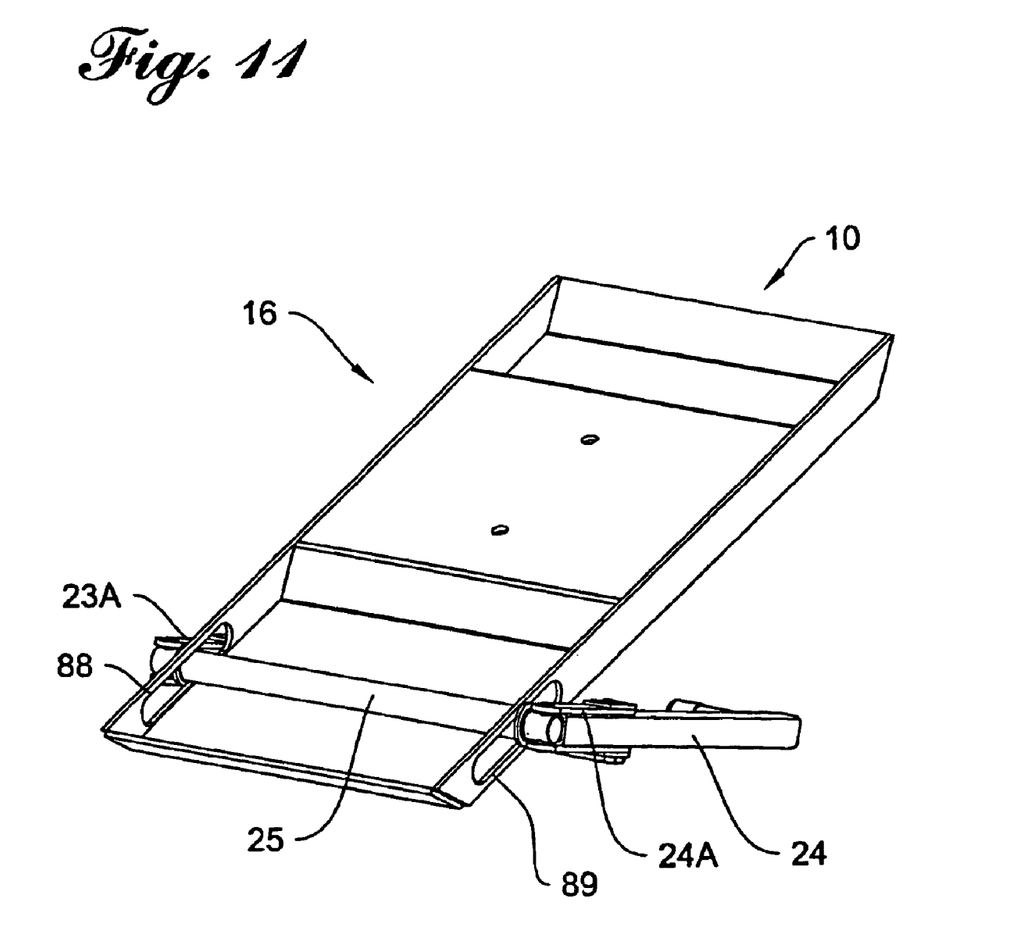
FIG. 11 is a bottom isometric view showing the transversely mounted arm axle, and the side slots between which it extends.

With particular emphasis directed to FIG. 11, this transverse axle 25 extends between chock sides 26A, 26B and is free to rotate relative to the chock. Axle 25 is preferably oriented perpendicularly to the longitudinal axis of the chock. Preferably the axle 25 is slidably captivated within and axially constrained by guide slots 27, 29 transversely defined in chock sides 26B, 26A respectively (FIGS. 1, 2, 11). Thus the axle 25 is interiorly confined within the chock, preferably within the control portion 19, but it is free to slide longitudinally, being confined within the guide slots. The axle and fork 22 can be moved towards or away from the wheel to be captivated. By moving the fork, the fork arms can be positioned such that that captivate the restrain the wheel to be locked. Each fork arm 23 and 24 comprises integral stubs 48 that face one another when the fork is properly deployed to captivate a wheel. The stubs are positioned towards the outermost ends of the arms. The purpose of the stubs is to penetrate a wheel well and/or to engage and/or captivate a wheel, locking it in between them in a sandwiched fashion.

The inner ends 23A and 24A of fork arms 23, 24 are pivoted to the axle ends 25A at connections 30, 31 (FIGS. 5, 7) respectively. As best seen by comparing FIGS. 5–7, the fork arms 23, 24 are thus free to rotate in a first plane that is coplanar with both arms 23 and 24 and axle 25. A circular arrow 33 has been drawn in FIG. 5 to indicate the latter pivot plane that each fork arm enjoys. On the other hand, by comparing FIGS. 1, 3 and 5 for example, it will be appreciated that the fork and its arms 23, 24 can also rotate about a center of rotation established by the axle 25, which has been generally indicated by arrow 33B in FIG. 6. These combined rotational features enhance the positional abilities of the arms, allowing them to adapt for a variety of wheels and tires of different sizes and shapes and configurations. Stated another way, since the fork arms may be adjusted apart and rotated relative to a wheel to be locked, they are able to accommodate numerous different configurations and sizes of wheels or tires.

Figure 6:
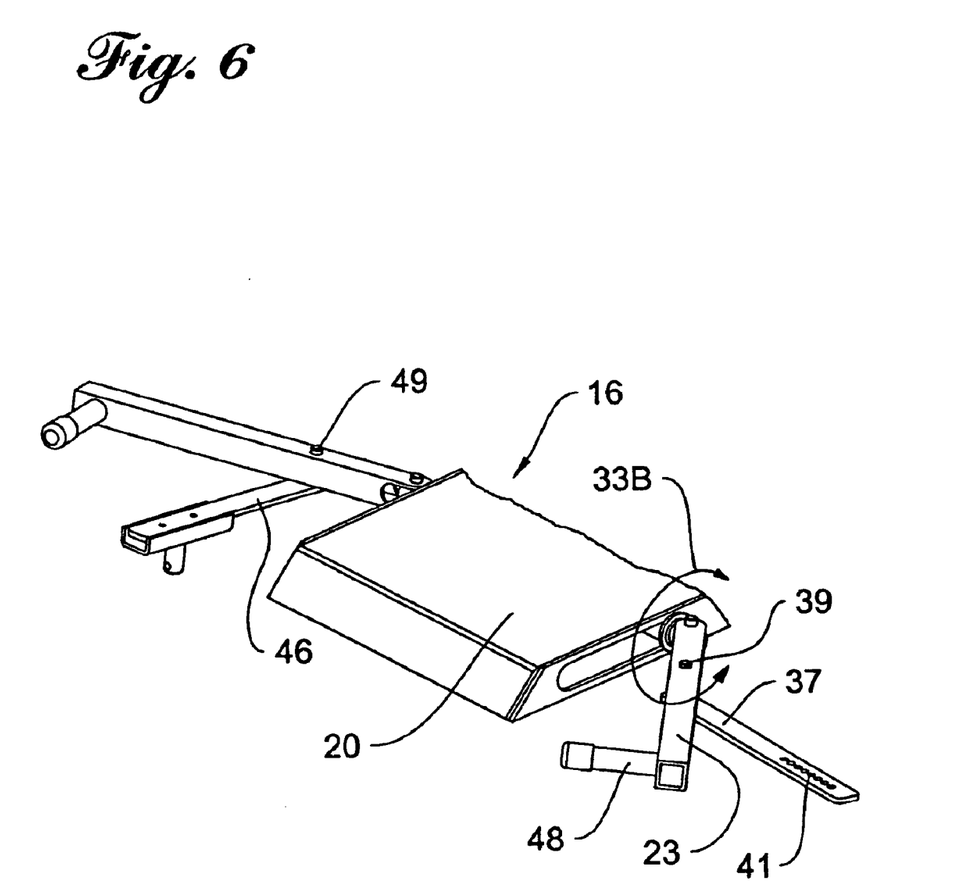
FIG. 6 is a fragmentary isometric view of the lock disposed in a partially unfolded orientation assumed prior to being installed upon a wheel.
Figure 7:
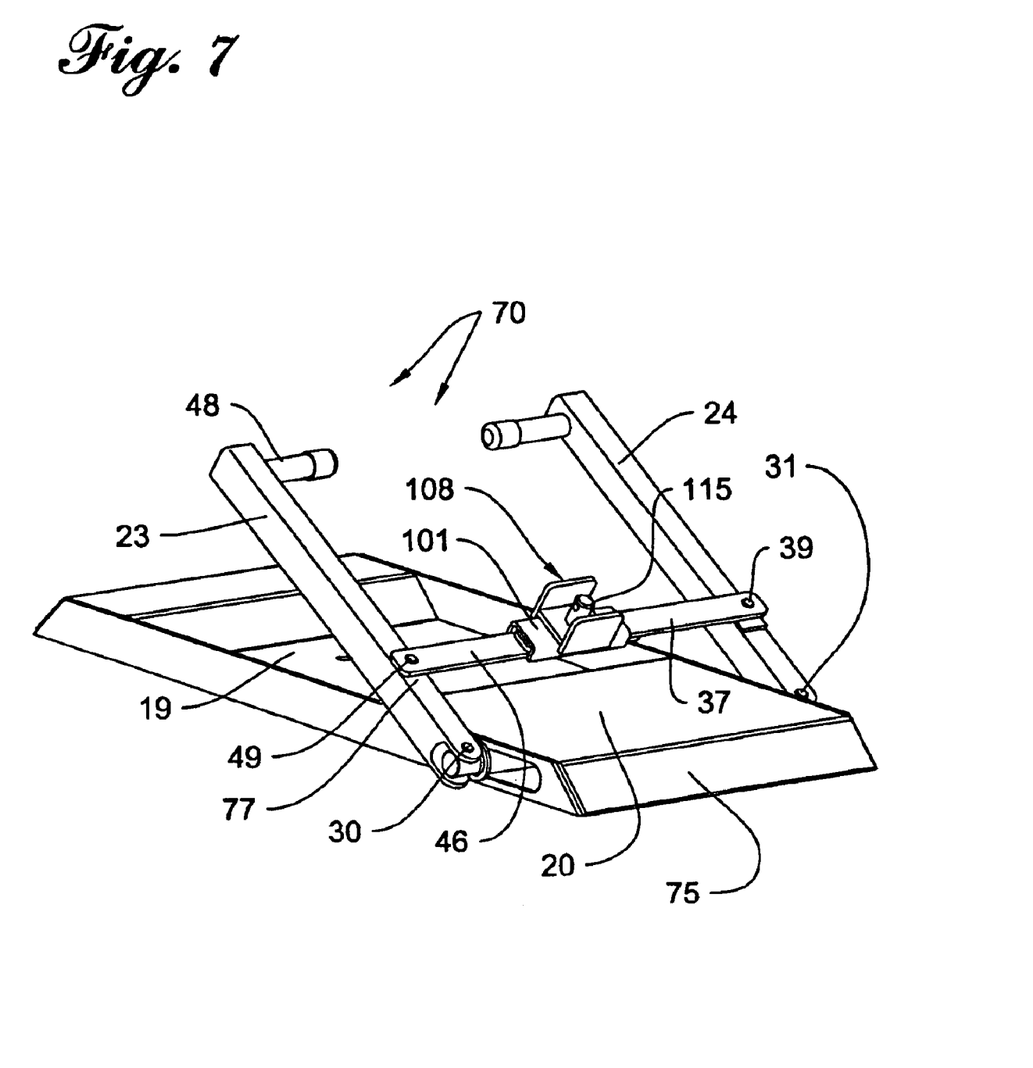
FIG. 7 is a fragmentary frontal isometric view, with the arms tightly drawn together.
Figure 8:
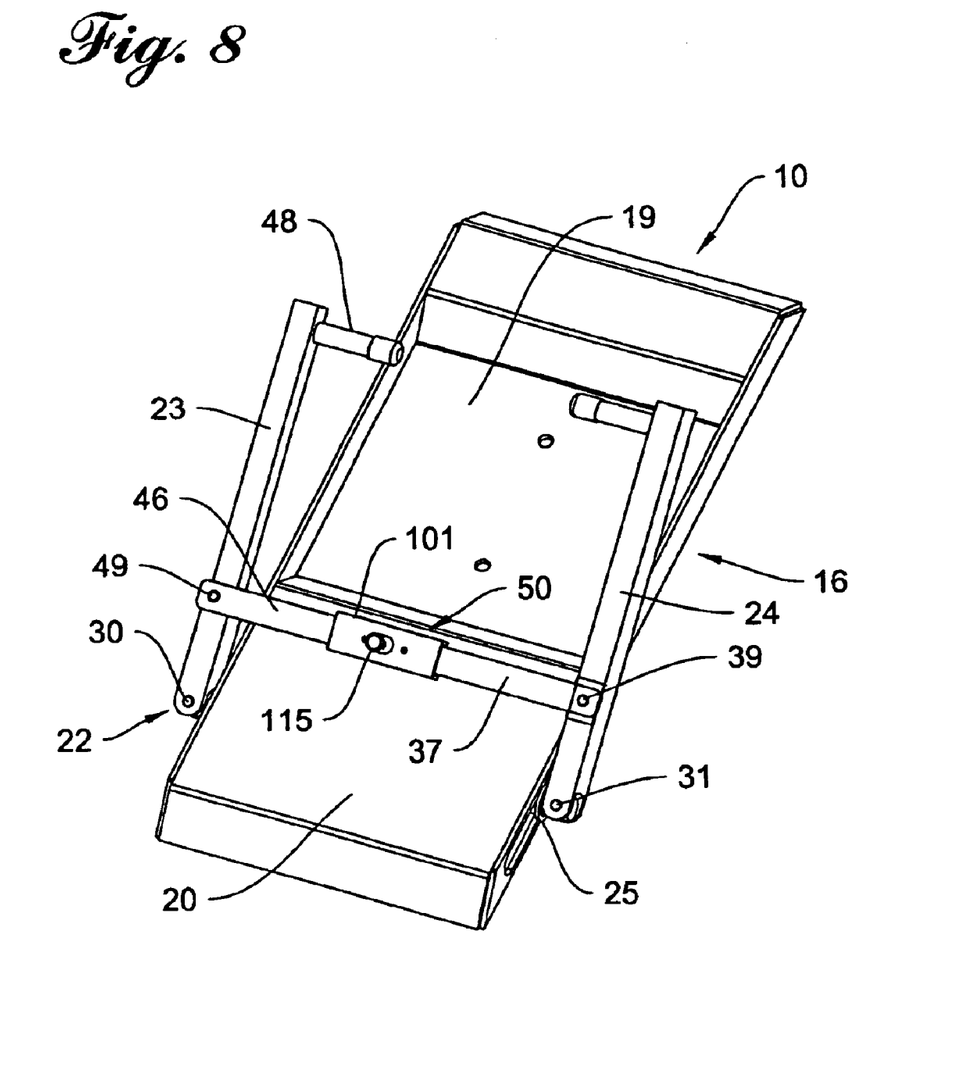
FIG. 8 is a frontal isometric view.
Figure 9:
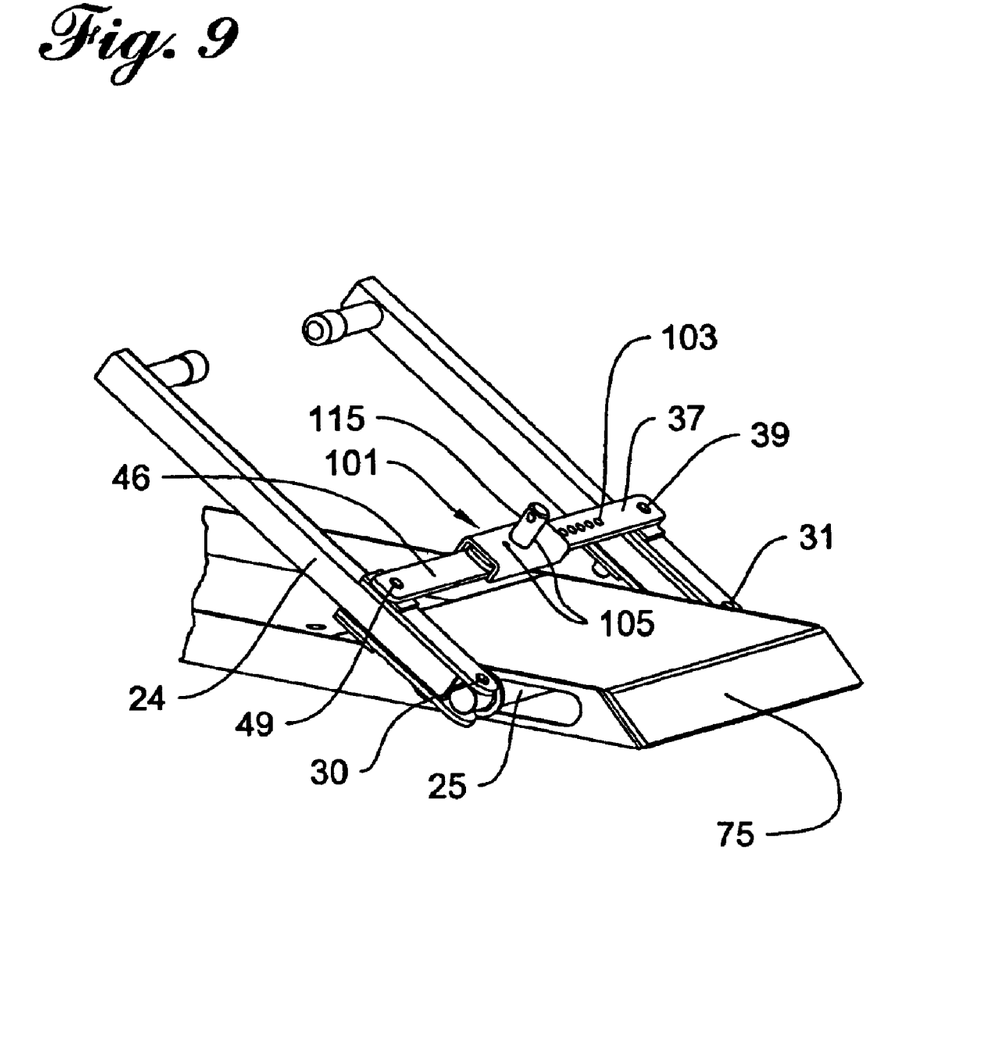
FIG. 9 is a fragmentary rear isometric view.
Figure 10:
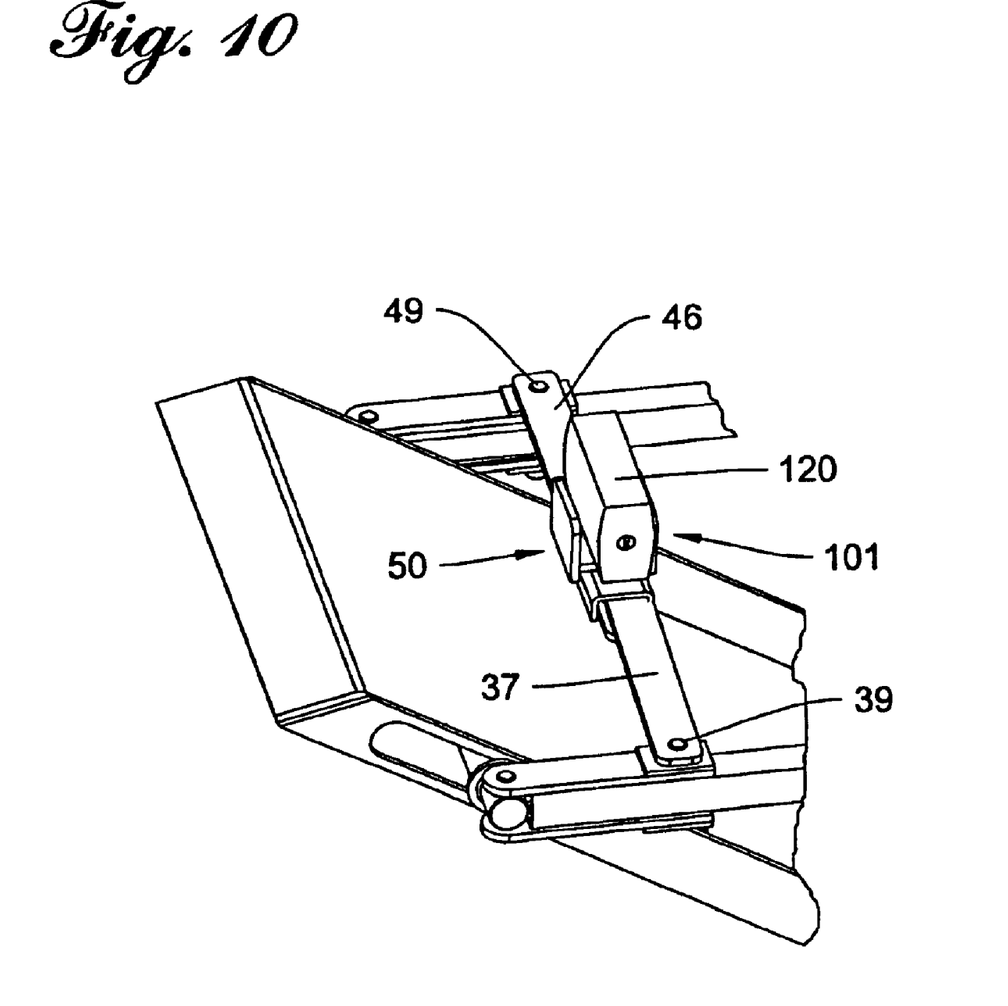
FIG. 10 is a fragmentary isometric view showing the preferred padlock shroud.

A preferred locking link system 50 is provided to lock the fork arms about a wheel once deployed properly. In FIG. 6, it is seen that link 37 is pivoted at one end to arm 24 at connection point 39. However, locking link 37 could be semi-permanently attached to either arm. The outer extreme of locking link 37 has a plurality of locking apertures 41 for locking purposes. Opposite fork arm 24 has a cooperating locking link 46 with an aperture that is adapted to register with apertures 41 in the link 37. Locking link 46 is pivotally connected to arm 23 (FIG. 8) at pivot point 49. Preferably the locking links are secured to the arms at an intermediate position between the arm connection point to axle 25, and the location of the stubs.

One way to secure the arms is thus to padlock the locking links when properly aligned. However locking system 50 is preferred. As noted in FIGS. 12 and 13, a rectangular plate 109 overlying the aligned ends of the locking links 37, 46 has mechanical sides skirts 111A, 111b registering with sides of the locking links 37, 46. An upright stub 115 secured to plate 109 has an orifice 118 for a padlock. A pair of locking orifices 105 are defined in plate 109 on opposites sides of stub 115. Plate 109 receives bracket 119 (FIG. 13). Bracket 119 has rigid spaced-apart sides 126, 127 secured to transverse base 128. A pair of bosses 130, 131 project downwardly from base 128 on opposite sides of a clearance orifice 131.

Figure 12:
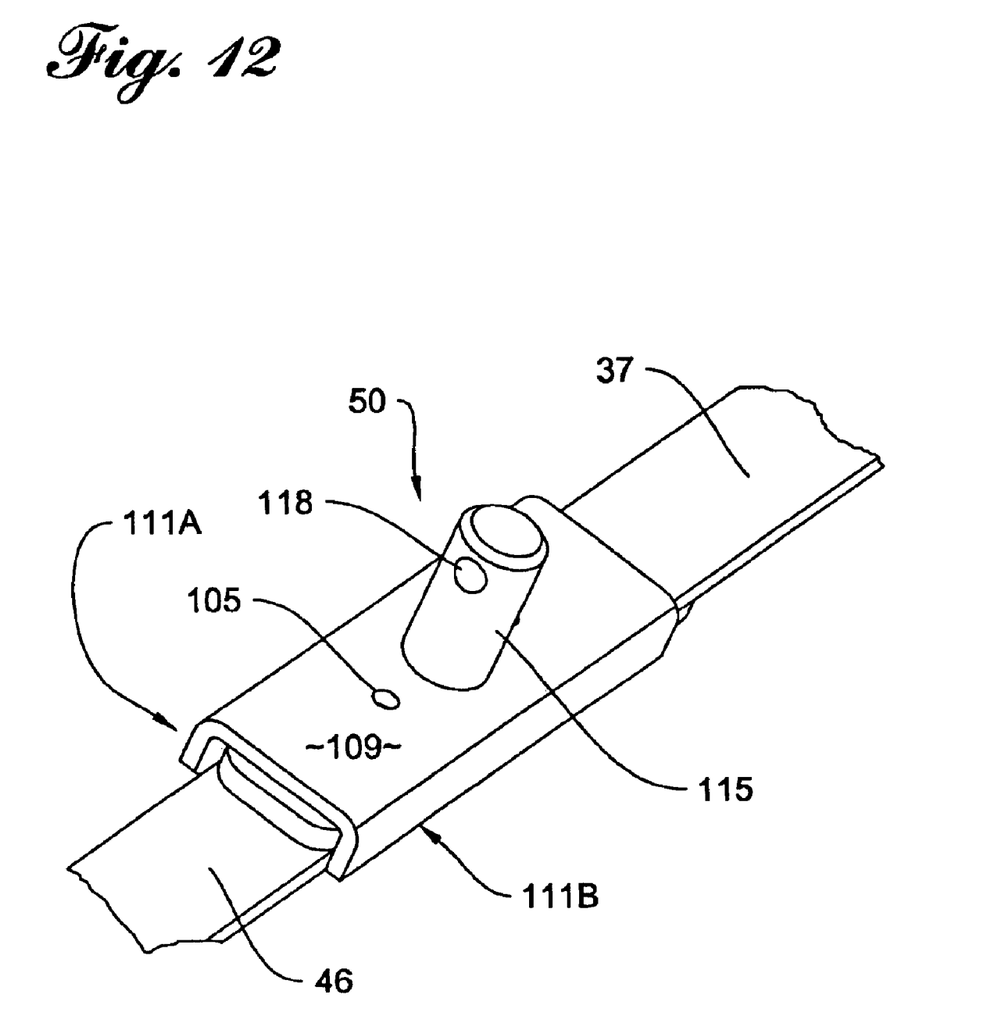
FIG. 12 is an enlarged, fragmentary, isometric view of the preferred link locking bracket; and, FIG. 13 is an enlarged, isometric view of the preferred locking latch that mates with the bracket of FIG. 12.
Figure 13:
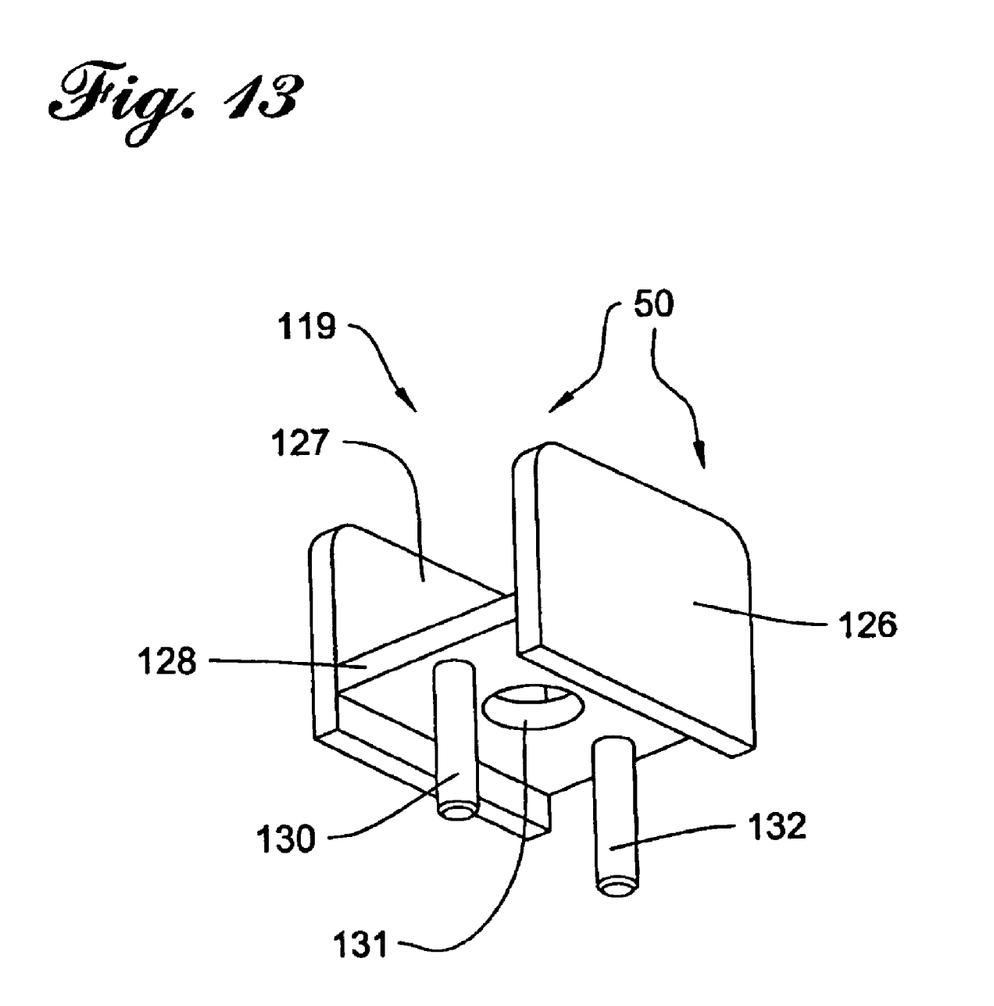

To lock the locking links, they are first positioned as in FIG. 12. Bracket 119 is inserted atop plate 109, with stub 115 penetrating orifice 130, and with downward bosses 130, 131 registering with orifices 105 in plate 109. At this time a padlock may be affixed to stub 115 through orifice 118, locking the fork arms together to captivate a wheel.

To install the device, it is placed flat upon the ground 18 adjacent a wheel to be locked. When placed upon a supporting surface that has suitable upwardly projecting bosses or anchors, orifices 91 (i.e., FIG. 4) in the cradle may be penetrated by the anchors to help secure the lock in place. The latter feature is useful at small airports for securing planes. The ATV is gently rolled unto the chock 16 over barrier 11 until it rests within cradle 20. Then the fork 22 is moved into engagement with the wheel by the combination of rotational and sliding movements. For example, it can be slided towards the wheel. The fork arms are then rotated towards the wheel, about the axle ends 25A until the arms stubs 48 are positioned within the wheel well or rear. Afterwards, the arms 23, 24 are folded towards one another, being moved as close together as possible, given the size of the wheel to be captivated. When installed, one stub will enter the wheel well 51 (i.e., FIG. 1) and the other stub will enter the rear volume 52 (FIG. 2) of the wheel. The wheel cannot be moved, because it will mechanically interfere with and be retrained by the stubs 48. At this time, the link 37 is rotated such that one of its locking apertures 41 is aligned with the orifice in locking link 46, so that a padlock 58 (FIG. 1) may be installed.

When thus installed, the chock will be affixed to the wheel, with the arms tightly wrapped adjacent the tire's sides. The link 37 will rigidly bridge the arms to lock the new wheel lock 10 semi-permanently in position.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations.

As many possible embodiments may be made of the invention without departing from the scope thereof it is to be understood that all matter herein set forth or shown in the accompanying drawings is to be interpreted as illustrative and not in a limiting sense.

What is claimed is:

1. A portable wheel lock for securing vehicle wheels, said wheel lock comprising:

a rigid, generally flat chock adapted to be disposed upon a supporting surface for supporting a wheel to be locked, the chock having a longitudinal axis, a pair of spaced-apart sides, and a front and rear;

elongated, parallel guide slots defined in said chock sides;

an elongated, axle transversely extending between said chock sides, said axle slidably confined within said guide slots and having a pair of ends;

a pair of arms for restraining and captivating said wheel to be locked, each arm pivotally coupled to an axle end;

wherein during deployment said arms are free to rotate in a first plane that is coplanar with both arms and the axle, and said arms can be moved generally towards said chock front and rear as said axle slides within said guide slots; and, locking links projecting from each arm that lock together substantially perpendicularly relative to said longitudinal axis once the stubs are properly placed about said wheel and the wheel lock is deployed.

2. The wheel lock of claim 1 wherein the chock comprise a raised barrier at said front, a control portion at the rear adjacent the cradle, and inclined dividers between the cradle and the control portion and between the cradle and barrier.

3. A portable wheel lock for securing vehicle wheels, said wheel lock comprising:

a rigid chock adapted to be disposed upon a generally flat surface for supporting a wheel to be locked, the chock having a longitudinal axis, a pair of spaced-apart sides, and a front and rear;

elongated, parallel guide slots defined in said chock sides that are substantially parallel with said longitudinal axis;

an elongated, rotatable axle transversely extending between said chock sides, said axle axially constrained between said guide slots and slidable within said guide slots towards or away from said front or rear in directions coincident with said longitudinal axis, said axle comprising a pair of spaced-apart ends;

a pair of arms for restraining and captivating said wheel to be locked, each arm comprising an end pivotally coupled to an axle end and terminating in stubs for captivating said wheel;

wherein during deployment said arms are free to rotate in a first plane that is coplanar with both arms and the axle, said arms can rotate about a center of rotation established by the axle, and said arms can be moved generally towards said chock front and rear as said axle slides within said guide slots; and, locking links projecting from each arm that lock together substantially perpendicularly to said longitudinal axis once the stubs are properly placed about said wheel, thereby locking said wheel lock.

4. A portable wheel lock for securing wheeled vehicles, said wheel lock comprising:

a rigid, generally flat chock adapted to be disposed upon a supporting surface, the chock comprising a pair of spaced-apart sides, guide slots defined in the chock sides, a longitudinal axis, and an internal cradle for receiving a wheel to be locked;

an elongated axle transversely extending interiorly of said chock between said chock sides that is axially confined between said slots and longitudinally slidable within said slots, said axle having a pair of ends;

an adjustable and displaceable fork dynamically secured to said chock, the fork comprising a pair of arms pivotally secured to said axle ends adapted to extend generally towards said wheel disposed within said cradle, each arm comprising:

an integral stub extending towards the wheel for restraining the wheel by engaging both sides of the wheel; and, locking links projecting from each arm that are adapted to be locked together substantially perpendicularly to said longitudinal axis once the stubs are properly placed about a wheel, thereby locking said portable wheel lock;

wherein, prior to locking, said fork arms are free to rotate in a first plane that is coplanar with both arms and the axle, and said fork arms can also rotate about a center of rotation established by the axle.

5. The wheel lock of claim 4 wherein the chock comprise a raised barrier at said front, a control portion at the rear adjacent the cradle, and inclined dividers between the cradle and the control portion and between the cradle and barrier.

* * * * *